US012461900B2

(12) United States Patent
Rout et al.

(10) Patent No.: US 12,461,900 B2
(45) Date of Patent: Nov. 4, 2025

(54) MACHINE LEARNING TECHNIQUES FOR ENHANCED DATA MAPPING

(71) Applicant: Optum, Inc., Minnetonka, MN (US)

(72) Inventors: Swapna Sourav Rout, Bangalore (IN); Sudeep Choudhary, Jharkhand (IN); Ankit Varshney, Delhi (IN); Snigdha Sree Borra, Hyderabad (IN)

(73) Assignee: Optum, Inc., Minnetonka, MN (US)

( * ) Notice: Subject to any disclaimer, the term of this patent is extended or adjusted under 35 U.S.C. 154(b) by 947 days.

(21) Appl. No.: 17/455,592

(22) Filed: Nov. 18, 2021

(65) Prior Publication Data

US 2023/0153280 A1  May 18, 2023

(51) Int. Cl.
*G06F 16/215* (2019.01)
*G06F 16/25* (2019.01)
*G06N 3/045* (2023.01)

(52) U.S. Cl.
CPC .......... *G06F 16/215* (2019.01); *G06F 16/258* (2019.01); *G06N 3/045* (2023.01)

(58) Field of Classification Search
CPC ..... G06F 16/215; G06F 16/258; G06N 3/045; G06N 3/048; G06N 20/00; G06N 3/044; G06N 3/08; G06N 3/084
See application file for complete search history.

(56) References Cited

U.S. PATENT DOCUMENTS

| 7,689,455 B2 | 3/2010 | Fligler et al. |
| 10,664,440 B2 | 5/2020 | Chang et al. |
| 2010/0268714 A1 | 10/2010 | Moon et al. |
| 2018/0357556 A1 | 12/2018 | Rai et al. |
| 2019/0129959 A1* | 5/2019 | Jagwani ................. G06F 16/217 |
| 2021/0034581 A1 | 2/2021 | Boven et al. |

(Continued)

FOREIGN PATENT DOCUMENTS

WO  2020/208163 A1  10/2020

OTHER PUBLICATIONS

Chalapathy, Raghavendra et al. "Deep Learning For Anomaly Detection: A Survey," arXiv preprint arXiv:1901.03407v2 [cs.LG] Jan. 23, 2019, (50 pages).

(Continued)

*Primary Examiner* — Reji Kartholy
(74) *Attorney, Agent, or Firm* — Alston & Bird LLP

(57) ABSTRACT

Various embodiments of the present invention provide methods, apparatus, systems, computing devices, computing entities, and/or the like for performing predictive data analysis operations. For example, certain embodiments of the present invention utilize systems, methods, and computer program products that perform predictive data transformation operations by machine learning models, where the predictive data transformation is performed based at least in part on a cross comparison of a pair of columns, accounting for the similarity of both the column names and the column values, inferred by the outputs of a machine learning model. Additionally, certain embodiments of the present invention utilize systems, methods, and computer program products that perform anomaly detection by using machine learning models that operate based at least in part on a comparison of the fixed-size representation of the column values resulting from the machine learning model.

18 Claims, 14 Drawing Sheets

(56) References Cited

U.S. PATENT DOCUMENTS

| | | | |
|---|---|---|---|
| 2021/0056118 A1 | 2/2021 | Mitra et al. | |
| 2021/0064636 A1* | 3/2021 | Park et al. | |
| 2021/0097139 A1* | 4/2021 | Gowda | G06F 18/24155 |
| 2021/0287069 A1* | 9/2021 | Mumcuyan | G06F 18/214 |
| 2022/0067626 A1* | 3/2022 | Unnikrishnan | G06Q 30/0283 |
| 2022/0374402 A1* | 11/2022 | Hawkins | G06F 16/215 |
| 2023/0306264 A1* | 9/2023 | Henderson | G06N 3/044 |
| 2023/0350913 A1* | 11/2023 | Aggarwal | G06F 16/285 |

OTHER PUBLICATIONS

Neculoiu, Paul et al. "Learning Text Similarity With Siamese Recurrent Networks," Proceedings of the 1st Workshop on Representation Learning for NLP, Aug. 11, 2016, pp. 148-157, Berlin, Germany.

* cited by examiner

MACHINE LEARNING TECHNIQUES FOR ENHANCED DATA MAPPING

BACKGROUND

Various embodiments of the present invention address technical challenges related to performing predictive data analysis operations and address the efficiency and reliability shortcomings of various existing predictive data analysis solutions, in accordance with at least some of the techniques described herein.

BRIEF SUMMARY

In general, embodiments of the present invention provide methods, apparatus, systems, computing devices, computing entities, and/or the like for performing predictive data analysis operations. For example, certain embodiments of the present invention utilize systems, methods, and computer program products that perform predictive data transformation operations by machine learning models, where the predictive data transformation is performed based at least in part on a cross comparison of a pair of columns, accounting for the similarity of both the column names and the column values, inferred by the outputs of a machine learning model. Additionally, certain embodiments of the present invention utilize systems, methods, and computer program products that perform anomaly detection by using machine learning models that operate based at least in part on a comparison of the fixed-size representation of the column values resulting from the machine learning model.

In accordance with one aspect, a method is provided. In one embodiment, the method comprises: for each column in the column pair: identifying at least one column name character of a column name of the column, for each column name character, determining a column name character embedding using a column name character embedding sub-model of a column name encoding machine learning model, determining a name-based encoding for the column using a sequential column name processing sub-model of the column name encoding machine learning model and based at least in part on each column name character embedding, identifying a plurality of sampled column values for the column, for each sampled column value: (i) determining a plurality of column value character embeddings for a plurality of column value characters of the sampled column value using a column value character embedding sub-model of a column value encoding machine learning model, and (ii) determining a column value encoding for the sampled column value using a sequential column value processing sub-model of the column value encoding machine learning model, and determining a value-based encoding of the column based at least in part on each column value encoding for the plurality of sampled column values; determining, based at least in part on each name-based encoding, a name-based cross-column similarity measure; determining, based at least in part on each value-based encoding, a value-based cross-column similarity measure; determining, based at least in part on the name-based cross-column similarity measure and the value-based cross-column similarity measure, the cross-column similarity measure; and performing one or more prediction-based actions based at least in part on the cross-column similarity measure.

In accordance with another aspect, a computer program product is provided. The computer program product may comprise at least one computer-readable storage medium having computer-readable program code portions stored therein, the computer-readable program code portions comprising executable portions configured to: identify at least one column name character of a column name of the column, for each column name character, determine a column name character embedding using a column name character embedding sub-model of a column name encoding machine learning model, determine a name-based encoding for the column using a sequential column name processing sub-model of the column name encoding machine learning model and based at least in part on each column name character embedding, identify a plurality of sampled column values for the column, for each sampled column value: (i) determine a plurality of column value character embeddings for a plurality of column value characters of the sampled column value using a column value character embedding sub-model of a column value encoding machine learning model, and (ii) determine a column value encoding for the sampled column value using a sequential column value processing sub-model of the column value encoding machine learning model, and determining a value-based encoding of the column based at least in part on each column value encoding for the plurality of sampled column values; determine, based at least in part on each name-based encoding, a name-based cross-column similarity measure; determine, based at least in part on each value-based encoding, a value-based cross-column similarity measure; determine, based at least in part on the name-based cross-column similarity measure and the value-based cross-column similarity measure, the cross-column similarity measure; and perform one or more prediction-based actions based at least in part on the cross-column similarity measure.

In accordance with yet another aspect, an apparatus comprising at least one processor and at least one memory including computer program code is provided. In one embodiment, the at least one memory and the computer program code may be configured to, with the processor, cause the apparatus to: identify at least one column name character of a column name of the column, for each column name character, determine a column name character embedding using a column name character embedding sub-model of a column name encoding machine learning model, determine a name-based encoding for the column using a sequential column name processing sub-model of the column name encoding machine learning model and based at least in part on each column name character embedding, identify a plurality of sampled column values for the column, for each sampled column value: (i) determine a plurality of column value character embeddings for a plurality of column value characters of the sampled column value using a column value character embedding sub-model of a column value encoding machine learning model, and (ii) determine a column value encoding for the sampled column value using a sequential column value processing sub-model of the column value encoding machine learning model, and determining a value-based encoding of the column based at least in part on each column value encoding for the plurality of sampled column values; determine, based at least in part on each name-based encoding, a name-based cross-column similarity measure; determine, based at least in part on each value-based encoding, a value-based cross-column similarity measure; determine, based at least in part on the name-based cross-column similarity measure and the value-based cross-column similarity measure, the cross-column similarity measure; and perform one or more prediction-based actions based at least in part on the cross-column similarity measure.

BRIEF DESCRIPTION OF THE DRAWINGS

Figure 1:
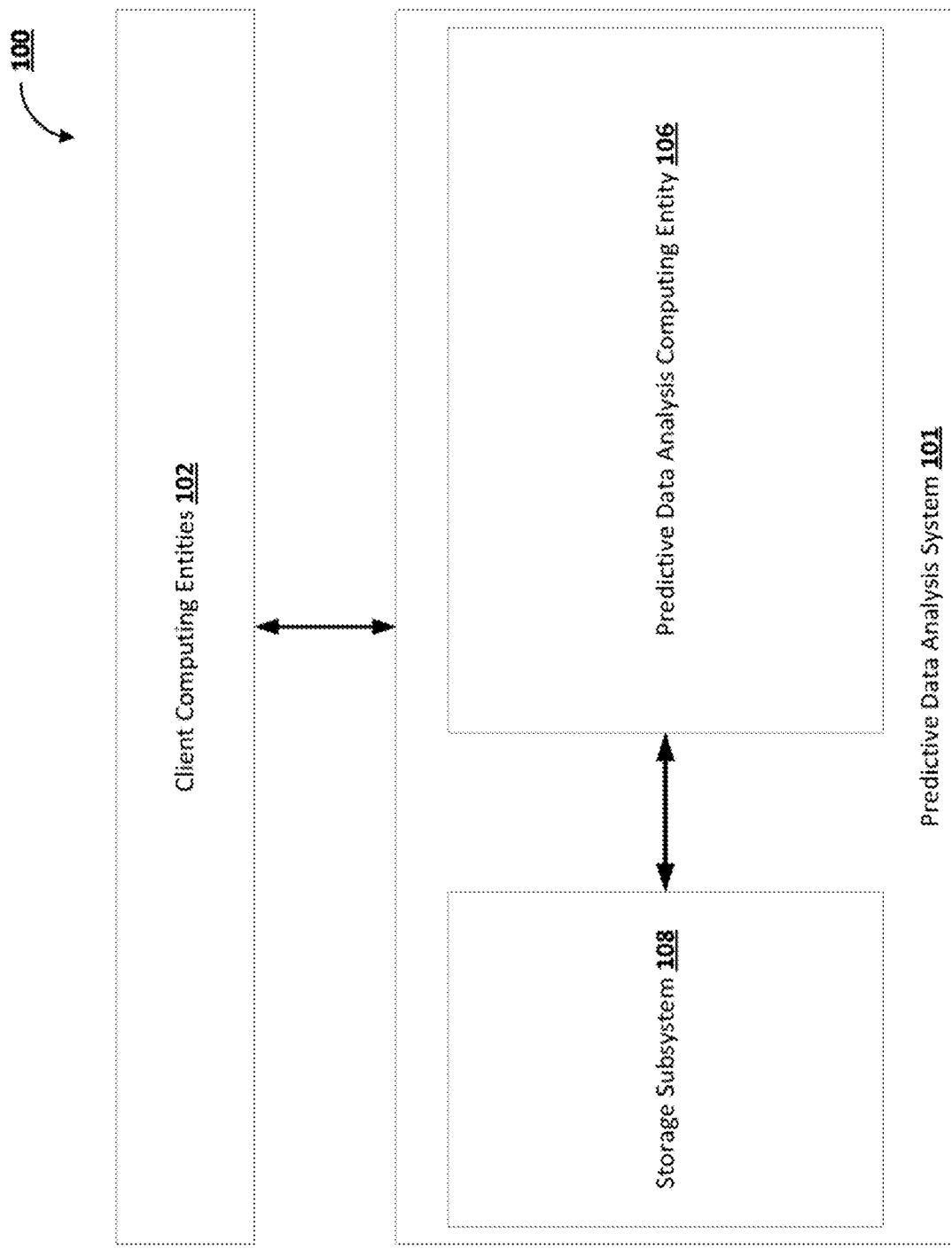

Having thus described the invention in general terms, reference will now be made to the accompanying drawings, which are not necessarily drawn to scale and wherein:

FIG. 1 provides an exemplary overview of an architecture that can be used to practice embodiments of the present invention.

Figure 2:
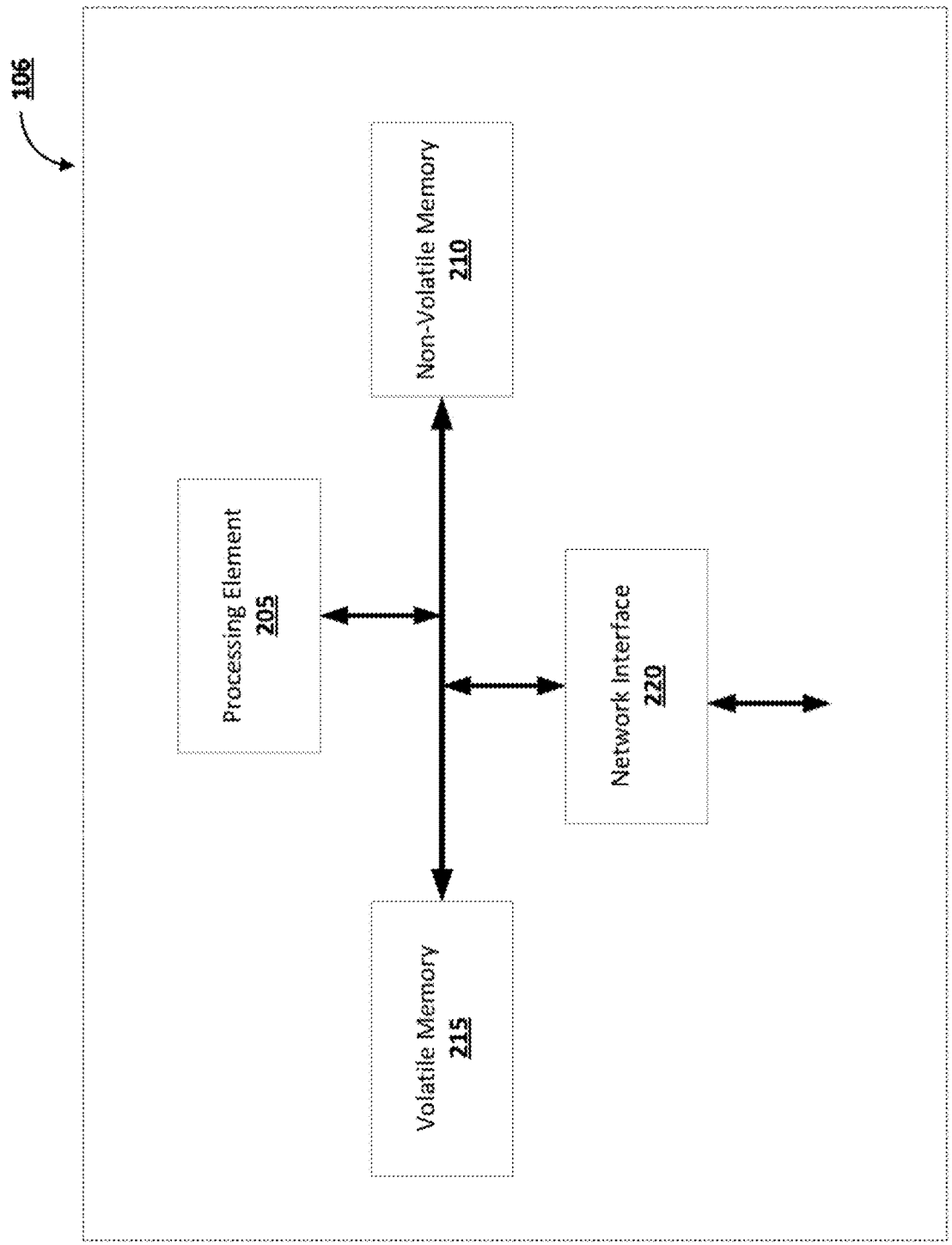

FIG. 2 provides an example predictive data analysis computing entity in accordance with some embodiments discussed herein.

Figure 3:
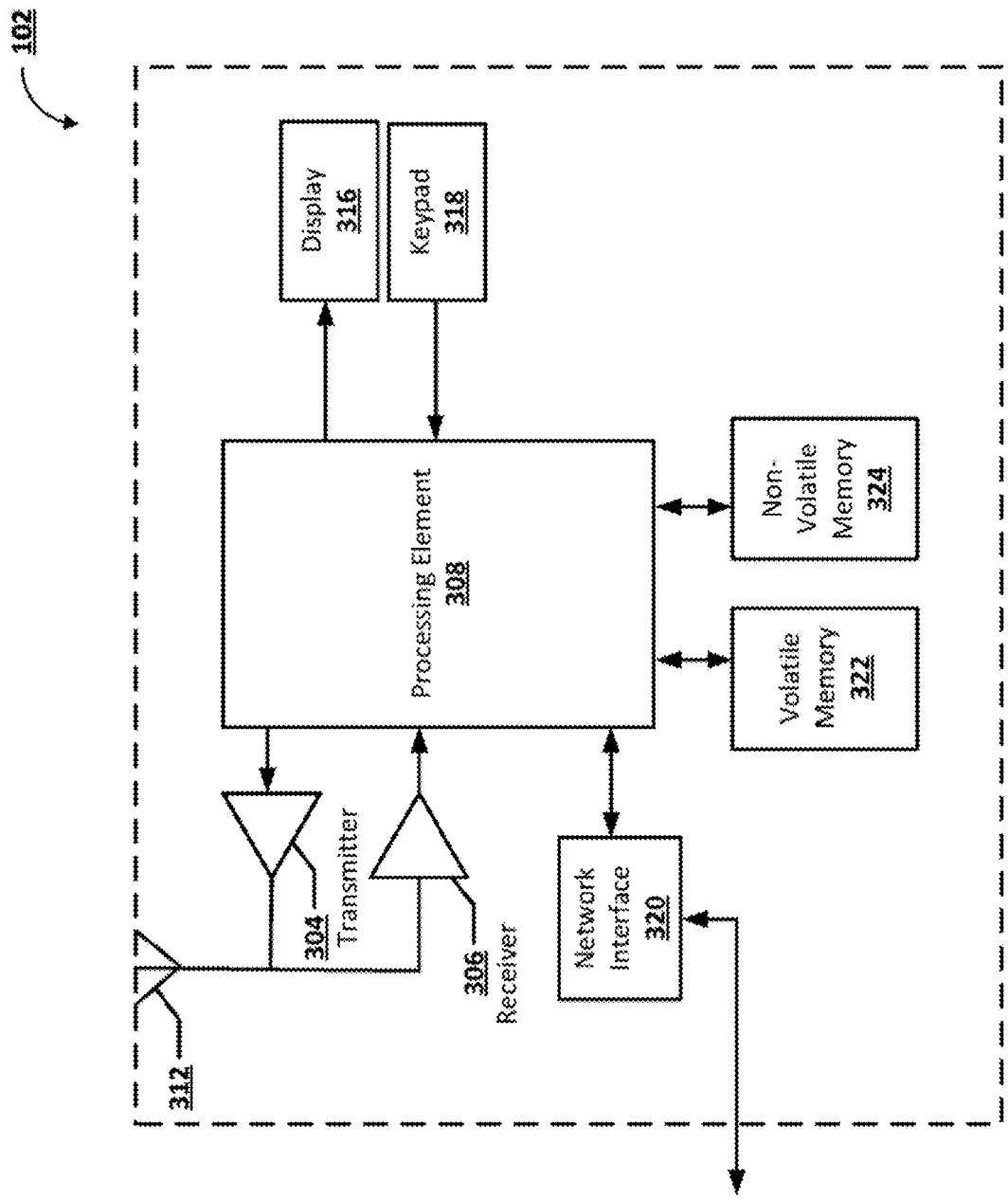

FIG. 3 provides an example client computing entity in accordance with some embodiments discussed herein.

Figure 4:
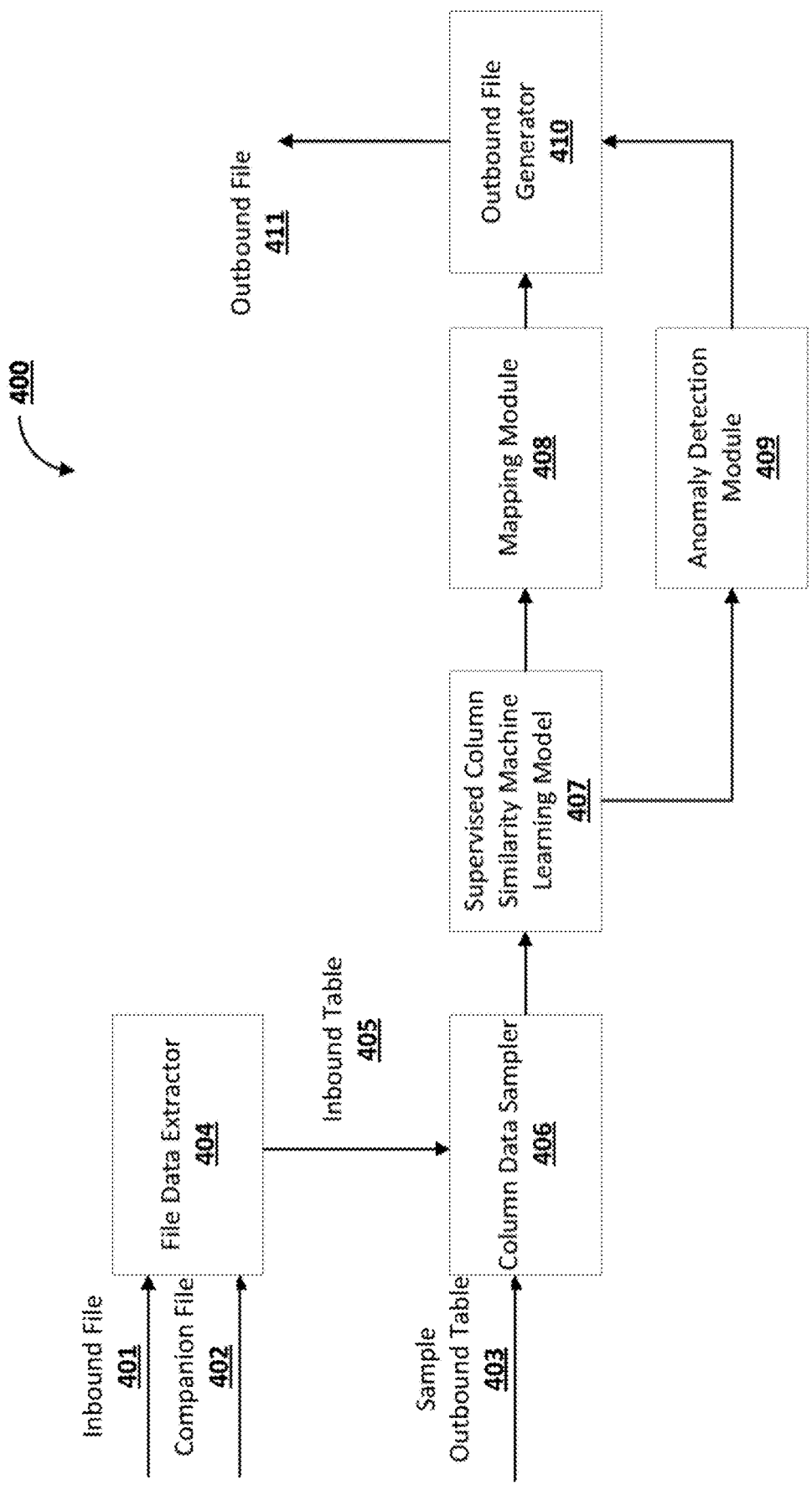

FIG. 4 provides a flowchart diagram of an example process for generating an outbound file based at least in part on a cross-column similarity measure, and based at least in part on column value anomaly measures in accordance with some embodiments herein.

Figure 5:
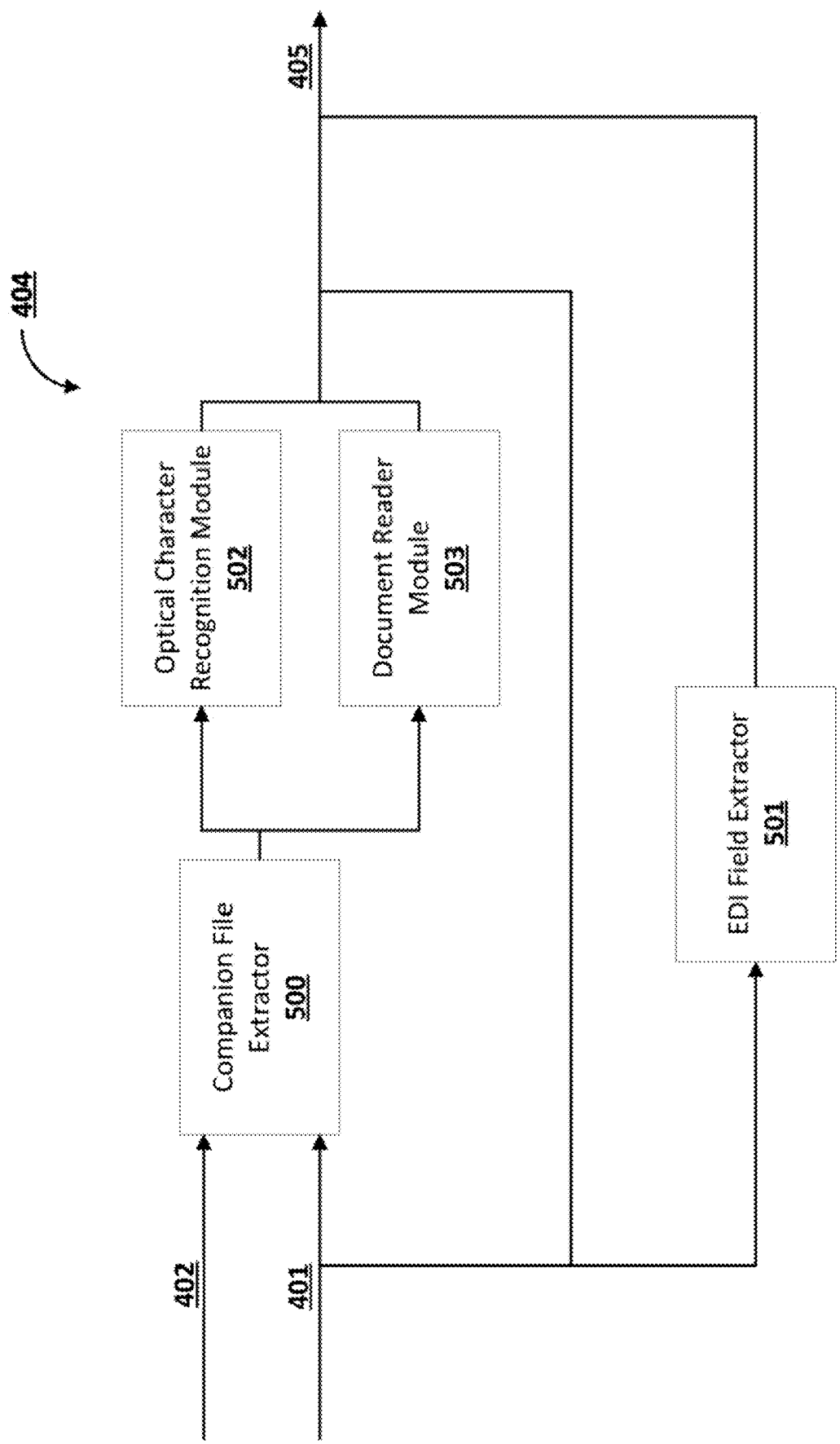

FIG. 5 provides a flowchart diagram of an example process for generating an inbound table based at least in part on extracting data from an inbound file using an Electronic Data Interchange (EDI) file extractor, or by automatically parsing a companion file.

Figure 6:
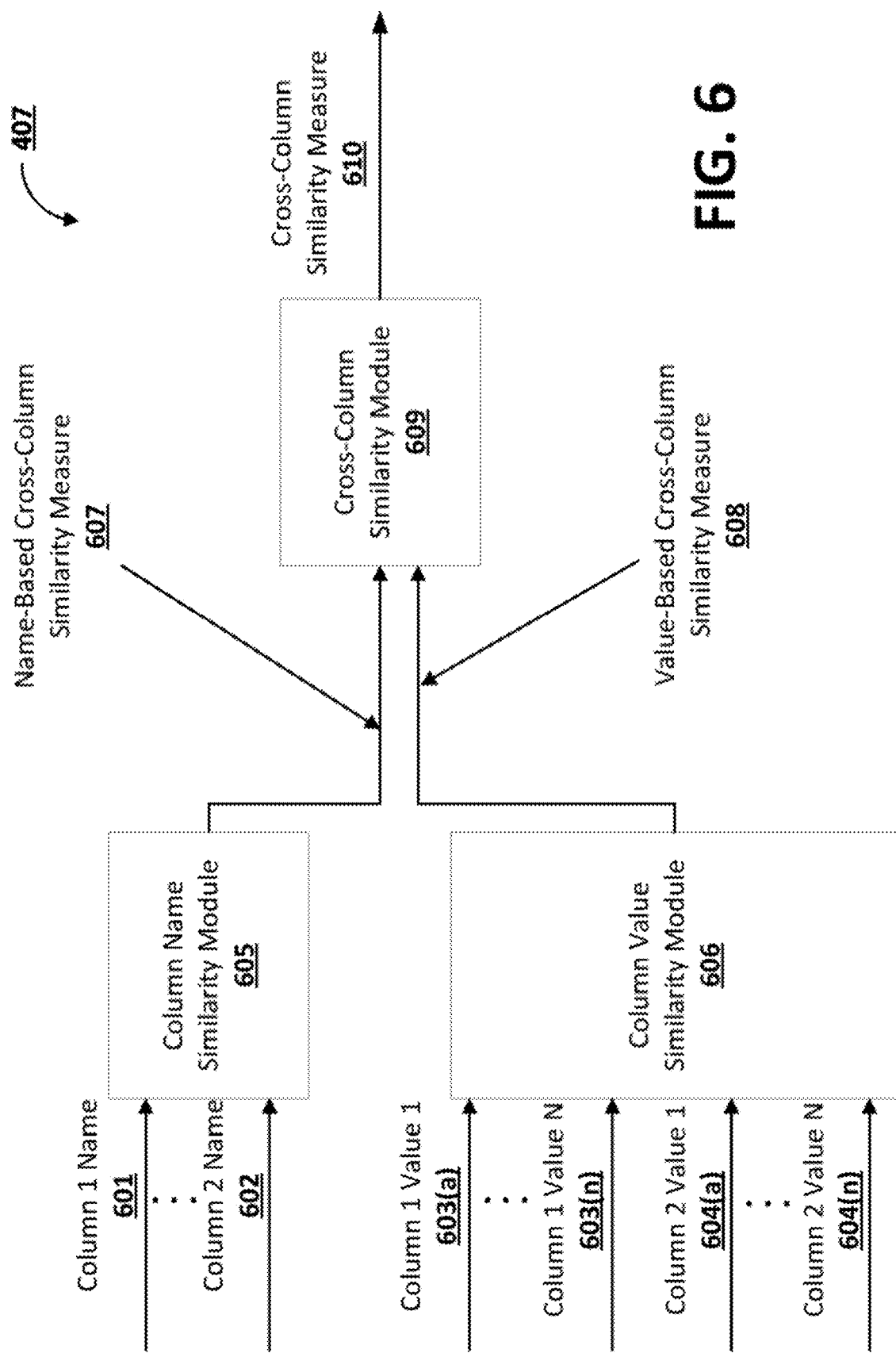

FIG. 6 provides a flowchart diagram of an example process for generating a cross-column similarity measure by applying a deep learning model to a pair of input columns in accordance with some embodiments discussed herein.

Figure 7:
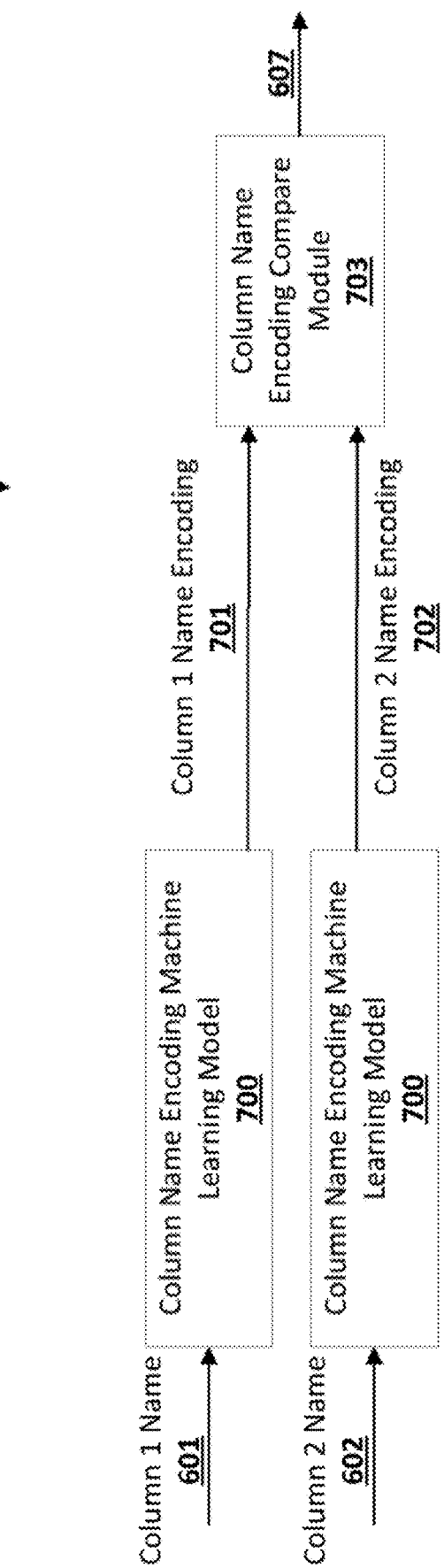

FIG. 7 provides a flowchart diagram of an example process for generating a name-based cross-column similarity measure based at least in part on a comparison of the encodings resulting from the application of a deep learning model to the column name of each column in a pair of input columns in accordance with some embodiments herein.

Figure 8:
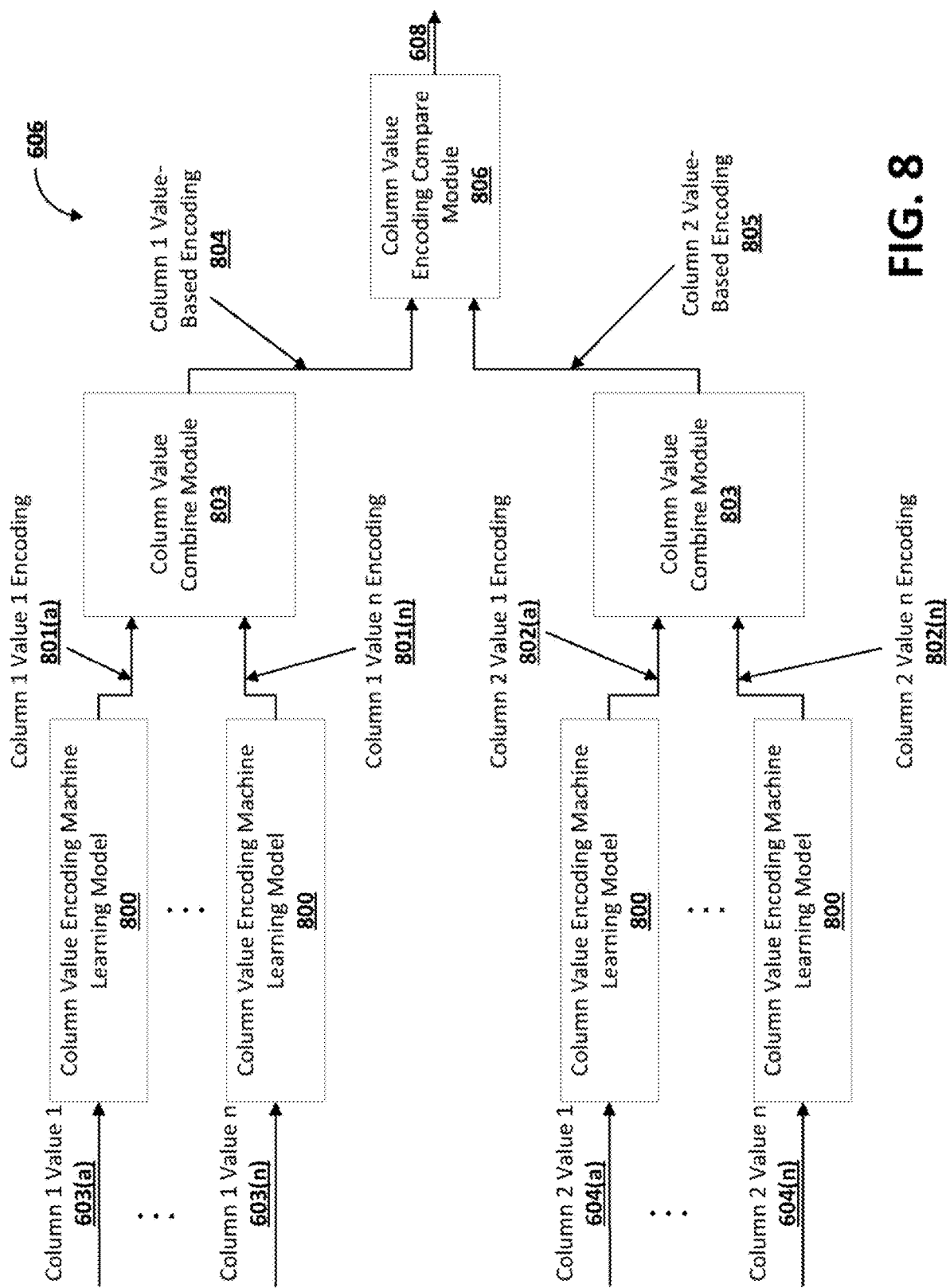

FIG. 8 provides a flowchart diagram of an example process for generating a value-based cross-column similarity measure based at least in part on a comparison of the combined outputs of the encodings resulting from the application of a deep learning model to each column value in a pair of input columns in accordance with some embodiments herein.

Figure 9:
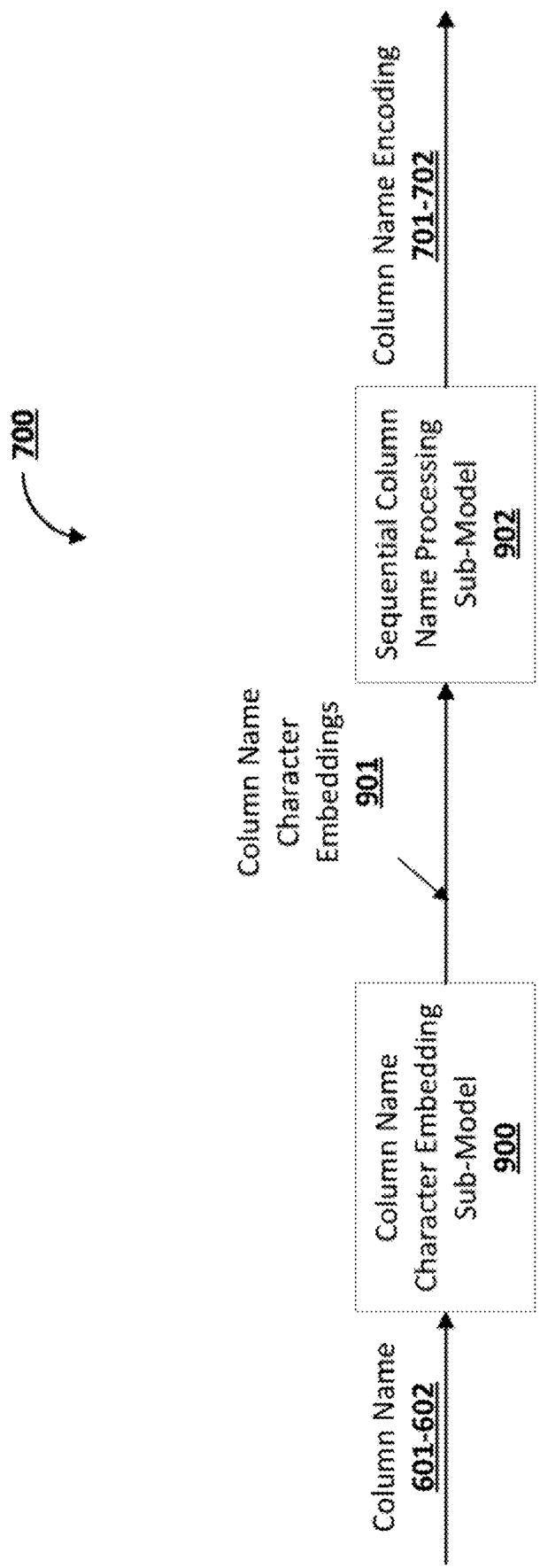

FIG. 9 provides a flowchart diagram of an example process of generating a column name encoding based at least in part on the resulting inference from a sequential deep learning inference layer using the character embedding of a column name as an input.

Figure 10:
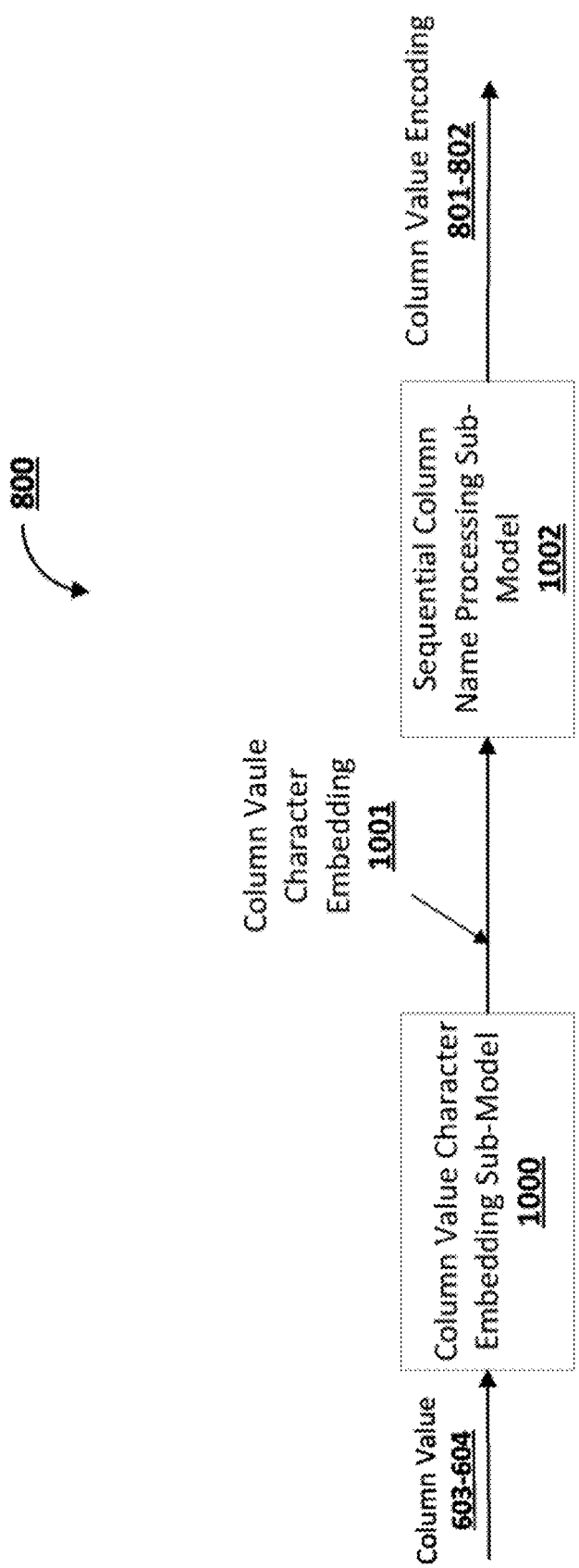

FIG. 10 provides a flowchart diagram of an example process of generating a column value encoding based at least in part on the resulting inference from a sequential deep learning inference layer using the character embedding of a column value as an input.

Figure 11:
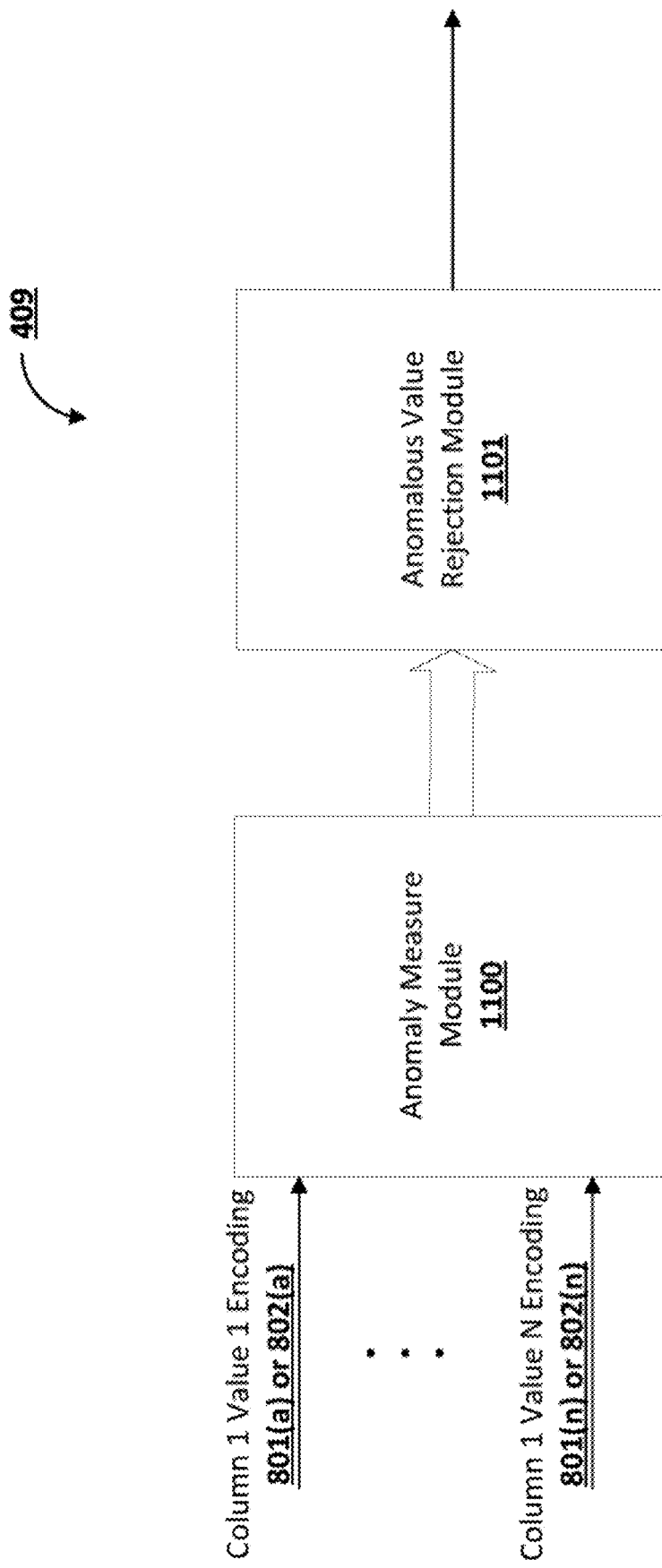

FIG. 11 provides a flowchart diagram of an example process for anomaly detection and rejection based at least in part on the value encoding output of a deep learning model for each of the values in a given column.

Figure 12:
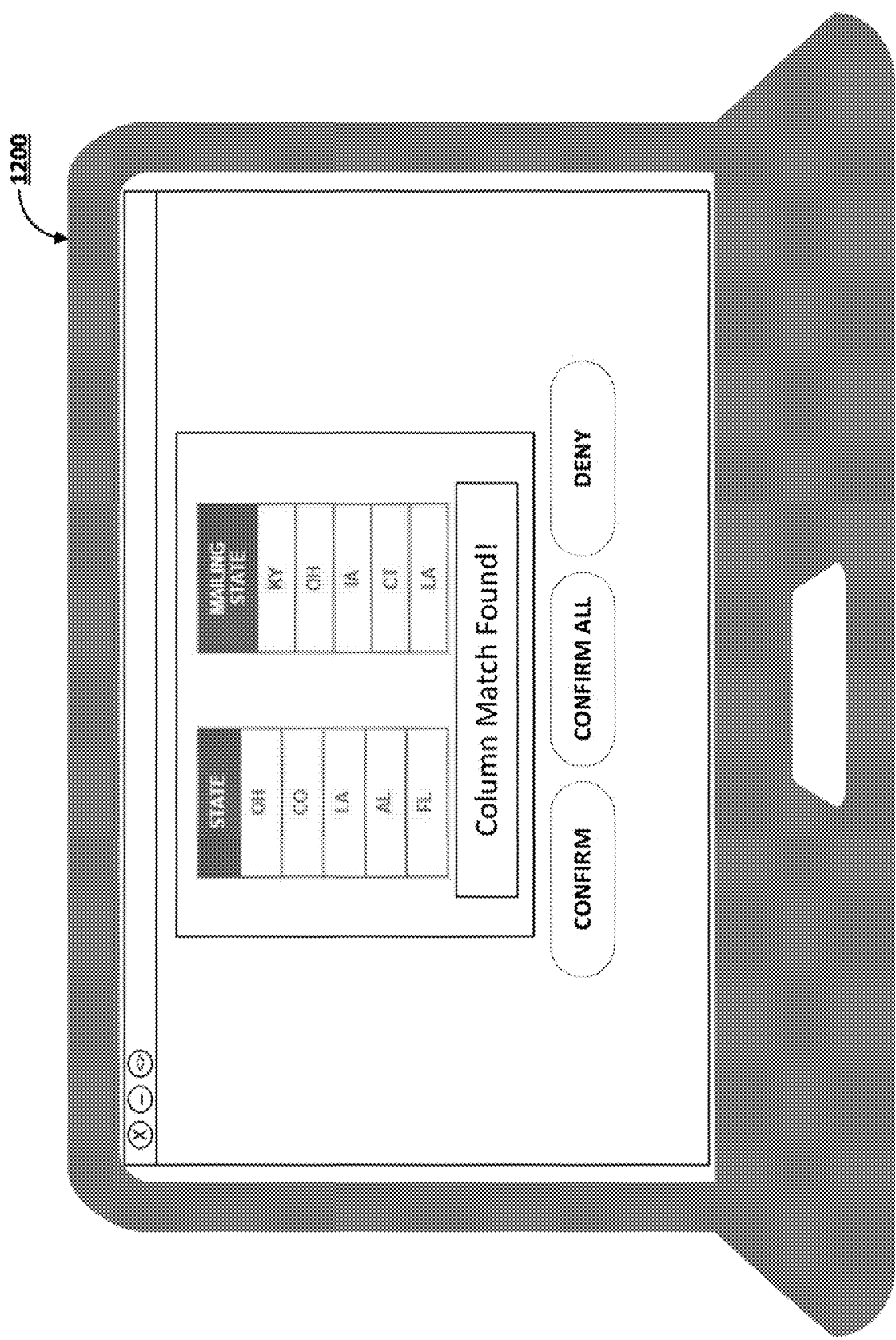

FIG. 12 provides an operation example of a user interface that depicts a data ingest prompt in accordance with some embodiments discussed herein.

Figure 13:
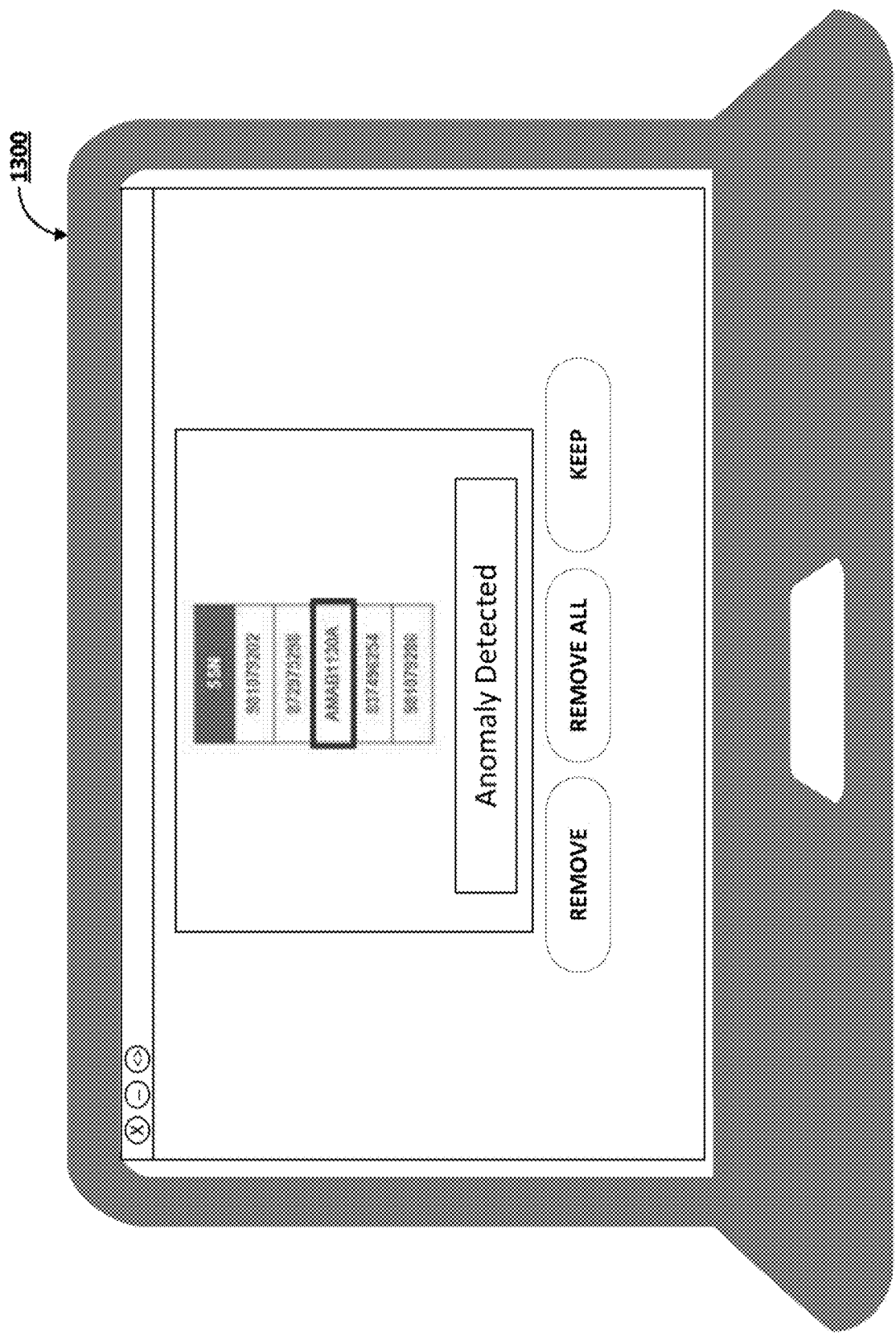

FIG. 13 provides an operation example of a user interface that depicts data about an anomalous column value in accordance with some embodiments discussed herein.

Figure 14:
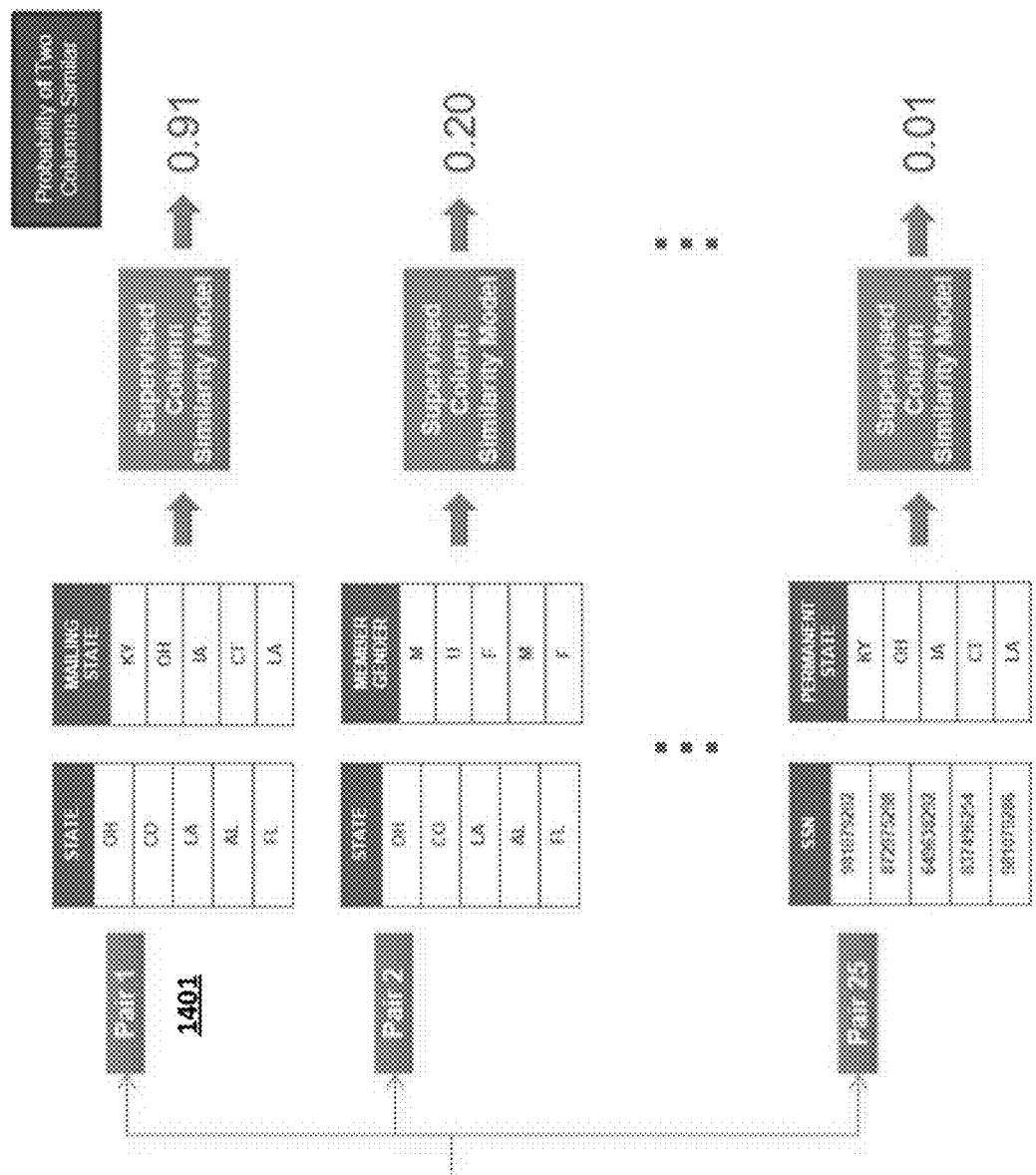

FIG. 14 provides an operation example of generating training data for a supervised column similarity machine learning model in accordance with some embodiments discussed herein.

DETAILED DESCRIPTION

Various embodiments of the present invention now will be described more fully hereinafter with reference to the accompanying drawing, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis tasks.

I. Overview and Technical Improvements

Various embodiments of the present invention introduce techniques for ingesting data into an existing data collection scheme. Commonly, there is need to ingest data from various sources into an existing scheme of collected data. Data from outside sources may exist in incompatible formats and structures. Often, it is necessary for an administrator or other professional to manually map and reformat the incoming data into a compatible format. Manual intervention greatly increases the time it takes to import new data into an existing data scheme. In addition, manual intervention in the data ingest process generally does not allow for quality checks. Oftentimes, inbound data contains bogus or anomalous data fields which may be erroneously ingested into the existing data scheme if no quality checks are performed. Accordingly, various embodiments of the present disclosure make important technical contributions to the field of data conversion by improving the computational efficiency, operational reliability, and operational throughput of data conversion systems.

Accordingly, various embodiments of the present invention address technical challenges associated with the ingest process of data from various sources into an existing data collection scheme. Aspects of the present invention provide an end-to-end system to load, map, and check incoming data. In this way, data ingestion and quality checks can be done with little to no manual intervention. This automated process leads to a drastic reduction in the overall turn-around-time of data ingestion and an improvement in the quality of the data ingestion.

For example, various embodiments of the present invention utilize systems, methods, and computer program products that perform predictive data analysis operations by generating cross-column similarity measures based at least in part on sequential machine learning models. The sequential machine learning models have been trained to analyze column names and values for each of the columns in the inbound table and a sample outbound table. The output encodings from the input data column names and values are compared to each of the columns in an existing data collection scheme and a cross-column similarity measure is generated. A mapping from the input table to the existing data collection scheme is then generated and applied. In addition, the output encodings for a given column can be used to generate an anomaly score and anomalous values can be purged from the inbound table. By using the noted techniques, various embodiments of the present invention use multiple machine learning models to map the input data from an inbound file to an existing data collection scheme with little to no manual intervention, while simultaneously purging the data of anomalous values.

II. Definitions

The term "anomaly measure" may refer to a data construct that is configured to describe a predicted likelihood that a specific column value of a specific column is deemed anomalous. In some embodiments, a computing entity determines an anomaly measure based at least in part on the distance/similarity measure of the specific column value's encoding compared to the distribution of encodings of a sample of column values of the same column. An example of a distance/similarity measure for a specific column value's encoding compared to the distribution of encodings is a pairwise cosine similarity distance measure. In some embodiments, this distance measure takes as input the representation of the specific column value generated at least in part by the output of a machine learning model and the combination of the representation of each of the sampled values of the specific column.

The term "column name character" may refer to a data construct that describes any single alphanumeric symbol that is part of the sequence of symbols that make up a column name. In some embodiments, the column name encoding machine learning model accepts as input a column name character. A fixed-size representation of the character is generated by the column name character embedding sub-model and the name-based encoding for the column is generated based at least in part on the sequence of column name characters.

The term "column value character" may refer to a data construct that describes any single alphanumeric symbol that is part of the sequence of symbols that make up a column value. In some embodiments, the column value encoding machine learning model accepts as input a column value character. A fixed-size representation of the character is generated by the column value character embedding sub-model and the value-based encoding for the column is generated based on a combination of the column value encodings for each of the sampled values in a column.

The term "column value encoding" may refer to a data construct representative of the fixed-length representation of a particular column value as generated by the column value encoding machine learning model. In some embodiments, a column value encoding machine learning model will take as input a sequence of column value characters for a specific column value. The data construct output from the column value encoding machine learning model, representing the sequence of column value characters, is the column value encoding for that column value. The column value encoding for each column value will be combined with each of the column value encodings of the sampled values in a column to determine the value-based encoding for a column.

The term "column name character embedding" may refer to a data construct that is configured to describe an embedded representation of a column name character. In some embodiments, a column name character embedding sub-model of a column name encoding machine learning model is configured to process each character of a column name to generate a representation of the character. This representation is the column name character embedding and is used in part by the sequential column name processing sub-model to generate the name-based encoding.

The term "column value character embedding" may refer to a data construct that is configured to describe an embedded representation of a column value character. In some embodiments, a column value character embedding sub-model of a column value encoding machine learning model is configured to process each character of a column value to generate a representation of the character. This representation is the column value character embedding and is input in sequence for each character to the sequential column value processing sub-model to generate a column value encoding.

The term "column name character embedding sub-model" may refer to a data construct that is configured to describe parameters, and/or defined operations of the embedding layer of the column name encoding machine learning model. In some embodiments, the column name character embedding sub-model is configured to process each character of a column name and generate a fixed-size representation of that character.

The term "column value character embedding sub-model" may refer to a data construct that is configured to describe parameters, and/or defined operations of the embedding layer of the column value encoding machine learning model. In some embodiments, the column value character embedding sub-model is configured to process each character of a column value and generate a fixed-size representation of that character.

The term "column name encoding machine learning model" may refer to a data construct that is configured to describe parameters, hyper-parameters, and/or defined operations of a machine learning model that is configured to process a column name of an input column in order to generate an inferred representation of the input column name to be compared with the inferred representation of a second input column and generate a similarity representation. In some embodiments, the column name encoding machine learning model includes at least two components: an embedding layer (also referred to herein as the column name character embedding sub-model) and a sequential inference layer (also referred to herein as the sequential column name processing sub-model). In some embodiments, the sequential inference layer may be configured as a bidirectional long-short term memory (Bi-LSTM) layer.

The term "column value encoding machine learning model" may refer to a data construct that is configured to describe parameters, hyper-parameters, and/or defined operations of a machine learning model that is configured to process a column value of an input column in order to generate an inferred representation of the input column value to be used in combination with the inferred representation of other input column values from the same column and to generate a combined representation (also referred to herein as the value-based encoding). In some embodiments, the column value encoding machine learning model includes at least two components: an embedding layer (also referred to herein as the column value character embedding sub-model) and a sequential inference layer (also referred to herein as the sequential column value processing sub-model). In some embodiments, the sequential inference layer may be configured as a bidirectional long-short term memory (Bi-LSTM) layer.

The term "column" may refer to a data construct that is configured to describe a collection of values that are grouped together and collectively associated with a column. While an example of a column is a column of values in a relational table as part of a relational database, a person of ordinary skill in the relevant technology will recognize that other named groupings of values may be functionally equivalent to a relational table column and thus be subject to column classification techniques introduced by various embodiments of the present invention. In some embodiments, a column is associated with a value set, which includes each column value that is associated with the column, as well as a column name.

The term "column pair" may refer to a data construct that is configured to describe a set of two columns. In some embodiments, a pair of columns is provided to determine the similarity of the columns using a cross-column similarity measure. Sufficiently similar columns will be classified as a match for purposes of data mapping.

The term "cross-column similarity measure" may refer to a data construct that is configured to represent the similarity of a pair of columns based at least in part on a name-based cross-column similarity measure and a value-based cross column similarity measure. In some embodiments, the cross-column similarity measure is determined using a weighted name-based cross-column similarity measure and a weighted value-based cross-column similarity measure as activation inputs to a sigmoid function. In some embodiments, the weights on the name-based cross-column similarity measure and the value-based cross-column similarity measure may be determined using a machine learning model.

The term "name-based cross-column similarity measure" may refer to a data construct that is configured to represent the similarity between the names of the columns in the column pair. This name-based cross-column similarity measure is determined based at least in part on the name-based encoding resulting from the column name encoding machine learning model for each of the column names in the pair of columns. In some embodiments, the name similarity is determined using the equation $NS=e^{(-\|nu-nv\|_1)}$, where nu is the name-based encoding for the first column, as generated by the column name encoding machine learning model, while nv is the name-based encoding for the second column, as generated by the column name encoding machine learning model The term "name-based encoding" may refer to a data construct representative of a fixed-length representation of a column name determined by the column name encoding machine learning model. In some embodiments, a sequential column name processing sub-model will take as input a sequence of column name character embeddings for a given column name. The name-based encoding output from the column name encoding machine learning model represents the sequence of column name characters for the given column.

The term "sequential column name processing sub-model" may refer to a data construct that is configured to describe parameters, hyper-parameters, and/or defined operations of the inference layer of a sequential machine learning model (also referred to herein as the column name encoding machine learning model) for the purpose of generating an inferred representation of the input column name. In some embodiments, the sequential column name processing sub-model may be configured as a bidirectional long-short term memory (Bi-LSTM) layer.

The term "sequential column value processing sub-model" may refer to a data construct that is configured to describe parameters, hyper-parameters, and/or defined operations of the inference layer of a sequential machine learning model (also referred to herein as the column name encoding machine learning model) for the purpose of generating an inferred representation of the input column name. In some embodiments, the sequential column name processing sub-model may be configured as a bidirectional long-short term memory (Bi-LSTM) layer.

The term "value-based encoding" may refer to a data construct representative of the combination of the column value encodings for each column value of the sampled values of a particular column. In some embodiments, the column value encoding of each of the sampled values of a particular column are concatenated to determine the value-based encoding.

The term "value-based cross-column similarity measure" may refer to a data construct that is configured to represent the similarity between the sampled values of the columns in the column pair. This value-based cross-column similarity measure is determined based at least in part on the value-based encoding for each of the columns in the column pair. In some embodiments, the value similarity is determined using the following equation $VS=e^{(-\|vu-vv\|_1)}$, where vu is the value-based encoding of values of the first column, as generated by the combined column value encodings of the sample column values, and vv is the value-based encoding of values of the second column, as generated by the combined column value encodings of the sample column values.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a scripting language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions. An example of a prediction-based action that can be performed using the predictive data analysis system 101 is matching an incoming data column to an existing data scheme such that the incoming data will be cleared of any anomalous entries and correctly ingested into the existing data scheme. Another example of a prediction-based action that can be performed using the predictive data analysis system is detecting an anomalous column value of a particular column.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software, and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis, as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application-specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry, and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts, such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including radio-frequency identification (RFID) tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102, and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

Provided below are exemplary techniques for generating a dynamically parameterized machine learning framework and for using a trained dynamically parameterized machine learning framework to perform one or more predictive inferences. However, while various embodiments of the present invention describe the model generation operations described herein and the predictive inference operations described herein as being performed by the same single computing entity, a person of ordinary skill in the relevant technology will recognize that each of the noted sets of operations described herein can be performed by one or more computing entities that may be the same as or different from the one or more computing entities used to perform each of the other sets of operations described herein.

As described below, various embodiments of the present invention address challenges associated with ingesting data from outside sources into an existing data collection scheme. By utilizing the techniques described in relation to the various embodiments of the present invention, data from outside sources can be automatically ingested into an existing data collection scheme with little to no manual intervention. In addition, quality data processing can be performed on the ingested data to ensure anomalous data is not ingested into the existing data collection. By utilizing the techniques described in relation to various embodiments of the present invention, data from an inbound file 401 can be brought in faster and without needless anomalous values, thus improving resource usage efficiency and operational throughput of automated data ingestion systems.

FIG. 4 depicts a flowchart diagram of an example process 400 for generating an outbound file 411 based at least in part on a cross-column similarity measure 610 that is generated based at least in part on the application of a sequential deep machine learning model to the inbound file 401 and an existing data collection scheme. In addition, process 400 shows an example process for performing anomaly detection and anomalous value rejection based at least in part on the value encodings generated by the sequential deep machine learning model. Via the various steps/operations of the process 400, a predictive data analysis computing entity 106 can, in part, use a machine learning model to determine the similarity of a pair of columns and recommend which column in the existing data collection scheme is the proper destination for a column of data to be input from the inbound file 401.

The process 400 begins when an inbound file 401 is received at the predictive data analysis computing entity 106. A sample outbound table 403 is also received, representative of the data collection scheme currently employed by the system to which the inbound file 401 will be ingested. The inbound file 401 may be any data construct used to represent data. In some embodiments, data constructs representing two-dimensional data files are provided, including data-base files, comma-separated value (CSV), electronic data interchange (EDI), electrocardiogram (ECG), or other similar files. In other embodiments, the inbound file 401 may be a data construct representing data in a fixed width file format.

In some embodiments, a companion file 402 is received at the predictive data analysis computing entity 106. The companion file 402 may specify the data format of the accompanying inbound file 401. The companion file 402 may be used by the file data extractor 404 to determine the data format of the inbound file 401.

After receiving the inbound file 401 and the companion file 402, the file data extractor 404 determines the format of the inbound file 401 and generates an inbound table 405 based at least in part on the determined format of the inbound file 401. Inbound files 401 can be sent in multiple formats and contain information in any number of various forms. Some inbound files 401 may be accompanied by a companion file 402, aiding in the determination of the format of the contained data, while others may not. Some inbound files 401 may arrive in recognized data formats, such as CSV, EDI, ECG, and others. In some embodiments, the file data extractor 404 receives the inbound file 401 and companion file 402 and determines the data format. The file data extractor 404 may then map the inbound file 401 to an inbound table 405 in a unified format that is digestible by the rest of the system.

The process 400 continues when the column data sampler 406 receives the inbound table 405 that is generated by the file data extractor 404 and a sample outbound table 403. The column data sampler 406 may be configured to select columns from the inbound table 405 and pair these columns with columns from the sample outbound table 403. The column data sampler 406 may select all possible pairs of columns where each column pair contains one column selected from the inbound table 405 and another column selected from the sample outbound table 403. Each pair of columns are passed to the supervised column similarity machine learning model 407 for determining a cross-column similarity measure 610 for the pair of columns.

The process 400 continues when each pair of columns generated by the column data sampler 406 is passed to the supervised column similarity machine learning model 407. The supervised column similarity machine learning model 407 generates a cross-column similarity measure 610 which may be determined based at least in part on a comparison of the output vectors from a deep learning model trained to recognize the similarity of column pairs. In some embodiments, more than one machine learning model may be employed to recognize the similarity of column names and column values.

The process 400 continues when the mapping module 408 selects the final mapping for each data column of the inbound table 405 to the sample outbound table 403 based at least in part on the cross-column similarity measure 610 generated by the supervised column similarity machine learning model 407. Data from a column of the inbound table 405 may be assigned to a selected column of the sample outbound table 403 that has the highest cross-column similarity measure 610 with respect to the column of the inbound table 405. In some embodiments, other factors may be used to assign columns to the columns of sample outbound table 403 based at least in part on a holistic approach, creating an overall mapping based at least in part on an optimal match considering all columns in the inbound file 401 and sample outbound table 403. The output of the mapping module 408 is then used by the outbound file generator 410 in part to generate the outbound file 411.

The process 400 continues when the intermediate outputs of the supervised column similarity machine learning model 407 (e.g., column value encodings for particular column values) are used to generate representations of a column based at least in part on a sample of column values of the inbound file 401 and/or sample outbound table 403. The generated column value representations (also referred to herein as the anomaly report) may then be used to identify anomalous values within the column as candidates for rejection. The anomalous values identified for rejection may be used in coordination with the output of the mapping module 408 by the outbound file generator 410 to purge the inbound table 405 of anomalous values before creating the outbound file 411. In some embodiments, the anomaly report may be sent back to a human user for confirmation before any purges to the inbound table 405 data are applied.

The process 400 continues when the outbound file generator 410 generates an outbound file 411 based at least in part on the mapping information provided by the mapping module 408 and considering the anomaly detection information provided by the anomaly detection module 409. The outbound file generator 410 uses the column mappings created by the mapping module 408 to ingest the data from an inbound table 405 column into the matched sample outbound table 403 column creating an outbound file 411. Data from the anomaly detection module 409 is optionally used to remove anomalous data from the inbound table 405 column. In some embodiments, the anomaly report may be sent back to a human user for confirmation before removal of any data from the inbound table 405 data. The outbound file 411 may be any data construct used to represent data suitable for ingestion into the existing data collection scheme. In some embodiments, data constructs representing two-dimensional data files are provided as output data, where the noted data constructs may include database files, comma-separated value (CSV), electronic data interchange (EDI), electrocardiogram (ECG), or other similar files. In other embodiments, the outbound file 411 may be a data construct representing data in a fixed width file format.

In some embodiments, the file data extractor 404 may perform steps/operations that correspond to the process that is depicted in FIG. 5. FIG. 5 depicts the process of generating an inbound table 405 in a standard form that is digestible by the rest of the system and containing the data from the inbound file 401. In some embodiments, a fixed length format inbound file 401 may be presented to the predictive data analysis computing entity 106 along with a companion file 402. In these embodiments, the companion file extractor 500 parses the companion file 402 to determine the data formatting for the inbound file 401 data. In some embodiments, in which the companion file 402 is a Portable Document Format (PDF), image, or other application independent file image, the file data extractor 404 will use an optical character recognition (OCR) module 502 to determine the data formatting for the inbound file 401. In other embodiments, in which the companion file 402 has a recognized format, such as a document (DOC) format, an Excel Spreadsheet (XLS) format, a comma-separated value (CSV) format, a fixed length format, a database file format, or other similar file format, the file data extractor 404 will use the document reader module 503 to parse the companion file 402 and determine the data format of the inbound file 401. Still, in other embodiments, the inbound file 401 may not be accompanied by a companion file 402. These inbound files 401 may, for example, be in an Electronic Data Interchange (EDI) format or similar structured data format. In these embodiments, the file data extractor 404 will use the EDI Field Extractor 501 (or a field extractor that is configured to operate on structured data formats other than EDI) to determine the format of the data in the inbound file 401. The EDI field extractor 501 may use a character-based sequential model to determine the encoding of each character in the inbound file 401. Using these character-level encodings, the EDI field extractor 501 may determine the data format of the inbound file 401. Once the data format of the inbound file 401 is determined either by use of the companion file extractor 500 and/or the EDI field extractor 501, the file data extractor 404 generates an inbound table 405, containing the data in the inbound file 401 in a standard form.

In some embodiments, process 400 may be performed using the supervised column similarity machine learning model 407 process that is depicted in FIG. 6. The supervised column similarity machine learning model 407 receives as input a pair of columns as determined by the column data sampler 406. The column data sampler 406 may provide all possible pairs of columns which may consist of one column from the inbound table 405 and one column from the sample outbound table 403. In some embodiments, these columns may contain a column name and values while in other embodiments only the values are present, and in still other embodiments, the column names may be system generated. In embodiments in which the column of data from the inbound table 405 and the column of data from the sample outbound table 403 contain a column name and at least one column value, the supervised column similarity machine learning model 407 calculates both a name-based cross-column similarity measure 607 and a value-based cross-column similarity measure 608. The name-based cross-column similarity measure 607 is generated to measure the proximity of one column name to another based at least in part on a sequential deep learning model. Similarly, the value-based cross-column similarity measure 608 is generated to measure the proximity of the values in one column to the values in another column.

Once the name-based cross-column similarity measure 607 and the value-based cross-column similarity measure 608 are generated, the supervised column similarity machine learning model 407 uses these values to generate a cross-column similarity measure 610 indicative of the similarity of the two columns to each other. In some embodiments, the cross-column similarity module 609 outputs a normalized score based at least in part on a sigmoid or other similar function. In still other embodiments, the cross-column similarity module 609 may take as activation inputs one or both of the name-based cross-column similarity measure 607 and the value-based cross-column similarity measure 608. In some embodiments, a weight may be applied to one or both of the name-based cross-column similarity measure 607 and the value-based cross-column similarity measure 608. In still other embodiments, the weights applied to the name-based cross-column similarity measure 607 and the value-based cross-column similarity measure 608 can be determined based at least in part on the output of a machine learning module.

In embodiments in which no column name is present, or the column name is system generated, the supervised column similarity machine learning model 407 may use only the column value similarity module 606 to determine the cross-column similarity measure 610. In still other embodiments in which the column values are missing or otherwise unusable, the supervised column similarity machine learning model 407 may use only the column name similarity module 605 to determine the cross-column similarity measure 610.

In some embodiments, the column name similarity module 605 may have the architecture that is depicted in FIG. 7. As depicted in FIG. 7, column name similarity module 605 generates a name-based cross-column similarity measure 607 when a pair of columns provided by the column data sampler 406 both contain a column name. The column name 601 for the first column in the column pair and the column name 602 for the second column in the column pair are each passed into a separate instance of the column name encoding machine learning model 700 to produce a column 1 name encoding 701 and a column 2 name encoding 702, respectively. In some embodiments, the column name encoding machine learning model 700 is implemented as a deep learning machine learning model. In the primary embodiment, the column name encoding machine learning model 700 is implemented as a long short term memory (LSTM) network, although it may be implemented as a convolutional neural network (CNN), Recurrent Neural Network (RNN), or other comparable deep learning network obvious to a person of ordinary skill in the art.

As further depicted in FIG. 7, once the column name encodings are generated, the column name encoding compare module 703 generates a name-based cross-column similarity measure 607 based at least in part on the output of the column name encoding machine learning model 700 for both the column name 601 for the first column in the column pair and the column name 602 for the second column in the column pair (i.e., based at least in part on the column 1 name encoding 701 and the column 2 name encoding 702). The column name encoding compare module 703 may determine the name-based cross-column similarity measure 607 based at least in part on a distance between the column 1 name encoding 701 and column 2 name encoding 702 output vectors. In some embodiments, the name-based cross-column similarity measure 607 is determined based at least in part on the Manhattan distance between the column 1 name encoding 701 and the column 2 name encoding 702. The Manhattan distance calculation may use an equation similar to Equation 1 to calculate the Manhattan distance:

$$\text{MaLSTM}(nu, nv) = e^{(-\|nu-nv\|_1)} \quad \text{Equation 1}$$

In Equation 1, nu is the representation vector of the name of column 1 as generated by the column name encoding machine learning model 700, and nv is the representation vector of the name of column 2, as generated by the column name encoding machine learning model 700. In other embodiments, the distance between the output vectors may be generated based at least in part on a cosine similarity, Euclidean distance, or other similar formulae.

In some embodiments, the column value similarity module 606 may have the architecture that is depicted in FIG. 8. As depicted in FIG. 8, column value similarity module 606 generates a value-based cross-column similarity measure 608 based at least in part on the values contained in each of the columns in the pair of columns provided by the column data sampler 406. Each of the sampled values in column 1 ($603(a)$-$603(n)$) are processed by an instance of the column value encoding machine learning model 800 to generate an encoding for each sampled column value in column 1 ($801(a)$-$801(n)$). In some embodiments the column value encoding machine learning model 800 is implemented as a deep learning machine learning model. In the primary embodiment, the column name encoding machine learning model 700 is implemented as a long short term memory (LSTM) network, although it may be implemented as a convolutional neural network (CNN), Recurrent Neural Network (RNN), or other comparable deep learning network obvious to a person of ordinary skill in the art.

As further depicted in FIG. 8, the column value combine module 803 generates a column 1 value-based encoding 804 and column 2 value-based encoding 805, based at least in part on the column value encodings for each of the sampled values in the respective column. In some embodiments, the column value combine module 803 may generate a column value-based encoding (804-805) based at least in part on the column value encodings (801(*a*)-801(*n*) and 801(*a*)-803(*n*)) by concatenating the column value encodings for a particular column. In other embodiments the column value encodings (801(*a*)-801(*n*) and 801(*a*)-803(*n*)) may be combined using another operation, such as value-wise addition, subtraction, or mean.

As further depicted in FIG. 8, the column value encoding compare module 806 generates a value-based cross-column similarity measure 608 based at least in part on the output of the column value combine module 803 for both the sampled column values 603(*a*)-603(*n*) of the first column and the sampled column values 604(*a*)-604(*n*) of the second column. The column value encoding compare module 806 may determine the value-based cross-column similarity measure 608, based at least in part on a distance between the column 1 value-based encoding 804 and column 2 value-based encoding 805 output vectors. In some embodiments, the value-based cross-column similarity measure 608 is determined based at least in part on the Manhattan distance between the column 1 value-based encoding 804 and the column 2 value-based encoding 805. The Manhattan distance calculation may use an equation similar to Equation 2 to calculate the Manhattan distance:

$$\text{MaLSTM}(vu, vv) = e^{(-\|vu - vv\|_1)} \quad \text{Equation 2}$$

In Equation 2, vu is the representation vector of the values of column 1 as generated by the column value combine module 803 and vv is the representation vector of the values of column 2, as generated by the column value combine module 803. In other embodiments, the distance between the output vectors may be generated based at least in part on a cosine similarity, Euclidean distance, or other similar formulae.

The column name encoding machine learning model 700 may have the architecture that is depicted in FIG. 9. As depicted in FIG. 9, the column name encoding machine learning model 700 generates a column name encoding 701-702 for a particular column in a column pair selected by the column data sampler 406 based at least in part on the output from a machine learning model operating on a column name 601-602 of the particular column. The machine learning model operates on each column name 601-602 separately and produces a column name encoding 701-702 for each column name. The first step/operation in the machine learning model is to generate a sequence of column name character embeddings 901 by the column name character embedding sub-model 900, where the sequence comprises a column name character embedding for each character (e.g., each character as defined by a character encoding system, such as the Unicode character encoding system, the American Standard Code for Information Interchange (ASCII) character encoding system, and/or the like) in the column name 601-602. The resulting column name character embeddings 901 for each column name are then provided as input to the sequential column name processing sub-model 902. The sequential column name processing sub-model 902 generates a column name encoding 701-702, based at least in part on a sequence of column name character embeddings for the sequence of characters for the individual column name. In the primary embodiment, the column name encoding machine learning model 700 is implemented as a bidirectional long short-term memory (Bi-LSTM) machine learning model.

In some embodiments, during each timestep of a sequence of timestep, the sequential column name processing sub-model 902 processes a column name character embedding of the sequence of column name character embeddings and a hidden state to generate an updated hidden state. In some embodiments, during each non-initial timestep, the hidden state for the non-initial timestep is determined based at least in part on the updated hidden state of a preceding timestep. In some embodiments, during each non-final timestep, the updated hidden state of the non-final timestep is provided as an input to a subsequent timestep. In some embodiments, during the initial timestep, the input hidden state is a default/predefined (e.g., an all zero) hidden state. In some embodiments, the column name encoding of a particular column is determined based at least in part on the updated hidden state of a final timestep of the sequential column name processing sub-model 902 when processing the column name character embeddings of the characters of the column name of the particular column.

In some embodiments, column value encoding machine learning model 800 may have the architecture that is depicted in FIG. 10. As depicted in FIG. 10, the column value encoding machine learning model 800 generates a column value encoding 801-802 for each of the sampled values in the column, based at least in part on the output from a machine learning model operating on a sampled column value 603-604 of the column given by the column data sampler 406. The machine learning model operates on each of the sampled column values 603-604 separately and generates a column value encoding 801-802 for each of the sampled column values in each of the selected columns. The first step/operation in the machine learning model is to generate a sequence of column value character embeddings 1001 by the column value character embedding sub-model 1000 for each sampled column value, where the sequence of column value character embeddings 1001 comprises a column value character embedding for each character of a particular column sampled column value. The resulting column value character embeddings 1001 for each of the sampled column values 603-604 in each of the columns is provided as input to the sequential column value processing sub-model 1002. The sequential column value processing sub-model 1002 generates a column value encoding 801-802 based at least in part on the sequence of characters for the individual column value. This encoding, when combined with the other value encodings in the column, can be used to determine the relatedness of the column values in a column from the inbound table 405 with the column values in a selected column in a sample outbound table 403. In the primary embodiment, the column value encoding machine learning model 800 is implemented as a bidirectional long short-term memory (Bi-LSTM) machine learning model.

In some embodiments, during each timestep of a sequence of timestep, the sequential column value processing sub-model 1002 processes a column value character embedding of the sequence of column value character embeddings and a hidden state to generate an updated hidden state. In some embodiments, during each non-initial timestep, the hidden state for the non-initial timestep is determined based at least in part on the updated hidden state of a preceding timestep. In some embodiments, during each non-final timestep, the updated hidden state of the non-final timestep is provided as an input to a subsequent timestep. In some embodiments, during the initial timestep, the input hidden state is a default/predefined (e.g., an all zero) hidden state. In some embodiments, the column value encoding of a particular column is determined based at least in part on the updated hidden state of a final timestep of the sequential column value processing sub-model 1002 when processing the column value character embeddings of the characters of the sampled column value of the particular column.

In some embodiments, the anomaly detection module 409 has the architecture that is depicted in FIG. 11. The anomaly detection module 409 generates an anomaly report based at least in part on intermediate values (e.g., column value encodings) from the supervised column similarity machine learning model 407. The first step/operation in the anomaly detection module 409 is to determine an anomalous measure for each of the sampled values in a selected column from the inbound table 405, based at least in part on the intermediate values generated by the supervised column similarity machine learning model 407, using the anomaly measure module 1100. The next step/operation in the anomaly detection module 409 is to generate an anomaly report based in part on the anomalous measures for each of the sampled values in the selected column from the inbound table 405 using the anomalous value rejection module 1101. In some embodiments, the anomalous measure generated by the anomaly measure module 1100 is based at least in part on the middle layer representations that are generated by the column value encoding machine learning model 800. In some embodiments, the anomaly report generated by the anomalous value rejection module 1101 is generated based at least in part on the anomalous measure for each of the sampled values of a particular column as compared to all other sampled column values of the particular column. In some embodiments, the anomalous value rejection module 1101 may generate the anomaly report based at least in part on performing a vector distance measure comparing the encodings of the column values. The vector distance measure may be generated based at least in part on a cosine similarity calculation, Manhattan distance calculation, Euclidean distance, or other similarity measure. In some embodiments, the anomaly report may be applied to the column mapping automatically to remove anomalous values from the inbound table 405. In other embodiments, the anomaly report may be presented to the user for confirmation before the anomaly report is applied to the data from the inbound table 405. In some embodiments, the anomaly detection report is applied to the mapped column values to generate the outbound file 411.

In some embodiments, the supervised column similarity machine learning model 407 can be trained using training data that are generated based at least in part on: (i) past mappings of columns, and/or (ii) by creating column value pairs that include two columns generated based at least in part on a common column and assigning the noted column value pairs an affirmative ground-truth similarity measure (e.g., a ground-truth similarity measure of one) and creating column value pairs that include two columns generated based at least in part on different columns and assigning the noted column value pairs a negative ground-truth similarity measure (e.g., a ground-truth similarity measure of zero). For example, as depicted in FIG. 14, the column pair 1401 is assigned a ground-truth similarity measure of one based at least in part on a past mapping.

In some embodiments, performing prediction-based actions includes generating user interface data for a prediction output user interface that describes predictive outputs (e.g., column matches, anomaly reports, and/or the like) for an end-user-initialized ingest of a data table from an outside data source. Operational examples of such prediction output user interfaces are depicted in FIG. 12 and FIG. 13. As depicted in FIG. 12, the prediction output user interface 1200 is generated in response to an ingest request specifying a data source and a destination data collection. The prediction output user interface 1200 displays the recommended column match and enables the user to confirm the column match, confirm all column matches without further authorization from the user, or deny the column match. As depicted in FIG. 13, the prediction output user interface 1300 is generated in response to an anomalous value detected in the input data contained in the inbound table 405 generated from the specified data source. The prediction output user interface 1300 displays the detected anomaly and enables the user to remove the anomaly, remove all detected anomalies without further authorization from the user, or keep the detected anomaly in the data set.

As described above, various embodiments of the present invention introduce techniques for ingesting outside data into an existing data collection scheme. Commonly, there is need to ingest data from various sources into an existing scheme of collected data. Data from outside sources may exist in incompatible formats and structures. Often, it is necessary for an administrator or other professional to manually map and reformat the incoming data into a compatible format. Manual intervention greatly increases the time it takes to import new data into an existing data scheme. In addition, manual intervention in the data ingest process generally does not allow for quality checks. Oftentimes, inbound data contains bogus or anomalous data fields which may be ingested into the existing data scheme if no quality checks are performed. Accordingly, various embodiments of the present disclosure make important technical contribution to the field of data conversion by improving the computational efficiency, operational reliability, and operational throughput of data conversion systems.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed, and that modification and other embodiments are intended to be included within the scope of the appended claims. Although specific terms are employed herein, they are used in a generic and descriptive sense only and not for purposes of limitation.

The invention claimed is:
1. A computer-implemented method comprising:
receiving, by one or more processors, (i) inbound data, (ii) a companion file specifying a data format of the inbound data, and (iii) a sample outbound table, wherein the sample outbound table comprises a representation of a data collection scheme currently employed by a system, and the data collection scheme is to which the inbound data will be ingested;
generating, by the one or more processors, an inbound table by extracting data from the inbound data based at least in part on the companion file;
generating, by the one or more processors and based at least in part on one or more encodings obtained from a column name encoding machine learning model and a column value encoding machine learning model, a cross-column similarity measure for a column pair, wherein the column pair comprises a first column from the inbound table and a second column from the sample outbound table, and wherein generating the cross-column similarity measure comprises:
identifying (i) a first plurality of column name characters of a first column name of the first column and (ii)

a second plurality of column name characters of a second column name of the second column;

determining, using a column name character embedding sub-model of the column name encoding machine learning model, (i) a first plurality of column name character embeddings based at least in part on the first plurality of column name characters and (ii) a second plurality of column name character embeddings based at least in part on the second plurality of column name characters;

determining, using a sequential column name processing sub-model of the column name encoding machine learning model, (i) a first name-based encoding for the first column based at least in part on the first plurality of column name character embeddings and (ii) a second name-based encoding for the second column based at least in part on the second plurality of column name character embeddings;

identifying (i) a first plurality of sampled column values for the first column and (ii) a second plurality of sampled column values for the second column;

determining, using a sequential column value processing sub-model of the column value encoding machine learning model, (i) a first plurality of column value encodings for the first plurality of sampled column values and (ii) a second plurality of column value encodings for the second plurality of sampled column values;

determining (i) a first value-based encoding of the first column based at least in part on the first plurality of column value encodings and (ii) a second value-based encoding of the second column based at least in part on the second plurality of column value encodings;

determining a name-based cross-column similarity measure for the column pair based at least in part on the first name-based encoding and the second name-based encoding;

determining a value-based cross-column similarity measure for the column pair based at least in part on the first value-based encoding and the second value-based encoding; and determining the cross-column similarity measure for the column pair based at least in part on the name-based cross-column similarity measure and the value-based cross-column similarity measure;

determining, by the one or more processors, an anomaly measure for a first column value encoding of the first plurality of column value encodings with respect to a second column value encoding of the second plurality of column value encodings;

determining, by the one or more processors, that the first plurality of sampled column values comprises one or more anomalous column values based at least in part on the anomaly measure;

automatically generating, by the one or more processors, a mapping from the inbound table to the sample outbound table while simultaneously purging the inbound table of the one or more anomalous column values, wherein the mapping is generated by selecting the column pair from a plurality of column pairs based at least in part on the cross-column similarity measure such that a column of the inbound table is assigned to a selected column of the sample outbound table, wherein the selected column of the sample outbound table has a highest cross-column similarity measure with respect to the column of the inbound table; and automatically ingesting, by the one or more processors, the inbound data into the data collection scheme according to the generated mapping and without the one or more anomalous column values.

2. The computer-implemented method of claim 1, wherein the second column is selected from a plurality of candidate second columns, and wherein the computer-implemented method further comprises:

determining a plurality of inferred cross-column similarity measures for the plurality of candidate second columns, and initiating performance of one or more prediction-based actions based at least in part on the plurality of inferred cross-column similarity measures.

3. The computer-implemented method of claim 1, further comprising:

determining a pairwise cosine similarity for a sampled column value pair, the sampled column value pair comprising (i) a first sampled column value of the first plurality of sampled column values and (ii) a second sampled column value of the second plurality of sampled column values, based at least in part on the first column value encoding of the first sampled column value in the sampled column value pair and the second column value encoding of the second sampled column value in the sampled column value pair; and determining the anomaly measure based at least in part on the pairwise cosine similarity for the sampled column value pair.

4. The computer-implemented method of claim 1, wherein the sequential column name processing sub-model comprises a bi-directional, long short-term memory neural network machine learning model.

5. The computer-implemented method of claim 1, wherein the sequential column value processing sub-model comprises a bi-directional, long short-term memory neural network machine learning model.

6. The computer-implemented method of claim 1, wherein:

the name-based cross-column similarity measure is determined based at least in part on a Manhattan distance between the first name-based encoding and the second name-based encoding.

7. The computer-implemented method of claim 1, wherein:

the value-based cross-column similarity measure is determined based at least in part on a Manhattan distance between the first value-based encoding and the second value-based encoding.

8. The computer-implemented method of claim 1, wherein:

a first weight is applied to the name-based cross-column similarity measure to create a weighted name-based cross-column similarity measure;

a second weight is applied to the value-based cross-column similarity measure to create a weighted value-based cross-column similarity measure; and the cross-column similarity measure is determined by applying a sigmoid function to an activation input that is determined based at least in part on the weighted name-based cross-column similarity measure and the weighted value-based cross-column similarity measure.

9. The computer-implemented method of claim 8, wherein the first weight and the second weight are determined during a training of a machine learning framework that comprises the column name encoding machine learning model and the column value encoding machine learning model.

10. A system comprising:
one or more processors; and
at least one memory storing processor-executable instructions that, when executed by the one or more processors, cause the one or more processors to perform operations comprising:
receiving (i) inbound data, (ii) a companion file specifying a data format of the inbound data, and (iii) a sample outbound table, wherein the sample outbound table comprises a representation of a data collection scheme currently employed by a system, the data collection scheme is to which the inbound data will be ingested;
generating an inbound table by extracting data from the inbound data based at least in part on the companion file;
generating, based at least in part on one or more encodings obtained from a column name encoding machine learning model and a column value encoding machine learning model, a cross-column similarity measure for a column pair, wherein the column pair comprises a first column from the inbound table and a second column from the sample outbound table, and wherein generating the cross-column similarity measure comprises:
identifying (i) a first plurality of column name characters of a first column name of the first column and (ii) a second plurality of column name characters of a second column name of the second column;
determining, using a column name character embedding sub-model of the column name encoding machine learning model, (i) a first plurality of column name character embeddings based at least in part on the first plurality of column name characters and (ii) a second plurality of column name character embeddings based at least in part on the second plurality of column name characters;
determining, using a sequential column name processing sub-model of the column name encoding machine learning model, (i) a first name-based encoding for the first column based at least in part on the first plurality of column name character embeddings and (ii) a second name-based encoding for the second column based at least in part on the second plurality of column name character embeddings;
identifying (i) a first plurality of sampled column values for the first column and (ii) a second plurality of sampled column values for the second column;
determining, using a sequential column value processing sub-model of the column value encoding machine learning model, (i) a first plurality of column value encodings for the first plurality of sampled column values and (ii) a second plurality of column value encodings for the second plurality of sampled column values
determining (i) a first value-based encoding of the first column based at least in part on the first plurality of column value encodings and (ii) a second value-based encoding of the second column based at least in part on the second plurality of column value encodings;
determining a name-based cross-column similarity measure for the column pair based at least in part on the first name-based encoding and the second name-based encoding;
determining a value-based cross-column similarity measure for the column pair based at least in part on the first value-based encoding and the second value-based encoding; and
determining the cross-column similarity measure for the column pair based at least in part on the name-based cross-column similarity measure and the value-based cross-column similarity measure;
determining an anomaly measure for a first column value encoding of the first plurality of column value encodings with respect to a second column value encoding of the second plurality of column value encodings;
determining that the first plurality of sampled column values comprises one or more anomalous column values based at least in part on the anomaly measure;
automatically generating a mapping from the inbound table to the sample outbound table while simultaneously purging the inbound table of the one or more anomalous column values, wherein the mapping is generated by selecting the column pair from a plurality of column pairs based at least in part on the cross-column similarity measure such that a column of the inbound table is assigned to a selected column of the sample outbound table, wherein the selected column of the sample outbound table has a highest cross-column similarity measure with respect to the column of the inbound table; and
automatically ingesting the inbound data into the data collection scheme according to the generated mapping and without the one or more anomalous column values.

11. The system of claim 10, wherein the second column is selected from a plurality of candidate second columns, and wherein the operations further comprise:
determining a plurality of inferred cross-column similarity measures for the plurality of candidate second columns, and
initiating a performance of one or more prediction-based actions based at least in part on the inferred cross-column similarity measures.

12. The system of claim 10, wherein the operations further comprise:
determining a pairwise cosine similarity for a sampled column value pair, the sampled column value pair comprising (i) a first sampled column value of the first plurality of sampled column values and (ii) a second sampled column value of the second plurality of sampled column values, based at least in part on the first column value encoding of the first sampled column value in the sampled column value pair and the second column value encoding of the second sampled column value in the sampled column value pair; and
determining the anomaly measure based at least in part on the pairwise cosine similarity for the sampled column value pair.

13. The system of claim 10, wherein the sequential column name processing sub-model comprises a bi-directional, long short-term memory neural network machine learning model.

14. The system of claim 10, wherein the sequential column value processing sub-model comprises a bi-directional, long short-term memory neural network machine learning model.

15. The system of claim 10, wherein:
the name-based cross-column similarity measure is determined based at least in part on a Manhattan distance between the first name-based encoding and the second name-based encoding.

16. The system of claim 10, wherein:
the value-based cross-column similarity measure is determined based at least in part on a Manhattan distance between the first value-based encoding and the second value-based encoding.

17. The system of claim 10, wherein:
a first weight is applied to the name-based cross-column similarity measure to create a weighted name-based cross-column similarity measure;
a second weight is applied to the value-based cross-column similarity measure to create a weighted value-based cross-column similarity measure; and
the cross-column similarity measure is determined by applying a sigmoid function to an activation input that is determined based at least in part on the weighted name-based cross-column similarity measure and the weighted value-based cross-column similarity measure.

18. One or more non-transitory computer-readable storage media including instructions that, when executed by one or more processors, cause the one or more processors to perform operations comprising:
receiving (i) inbound data, (ii) a companion file specifying a data format of the inbound data, and (iii) a sample outbound table, wherein the sample outbound table comprises a representation of a data collection scheme currently employed by a system, and the data collection scheme is to which the inbound data will be ingested;
generating an inbound table by extracting data from the inbound data based at least in part on the companion file;
generating, based at least in part on one or more encodings obtained from a column name encoding machine learning model and a column value encoding machine learning model, a cross-column similarity measure for a column pair, wherein the column pair that comprises a first column from the inbound table and a second column from the sample outbound table, and wherein generating the cross-column similarity measure comprises:
identifying (i) a first plurality of column name characters of a first column name of the first column and (ii) a second plurality of column name characters of a second column name of the second column;
determining, using a column name character embedding sub-model of the column name encoding machine learning model, (i) a first plurality of column name character embeddings based at least in part on the first plurality of column name characters and (ii) a second plurality of column name character embeddings based at least in part on the second plurality of column name characters;
determining, using a sequential column name processing sub-model of the column name encoding machine learning model, (i) a first name-based encoding for the first column based at least in part on the first plurality of column name character embeddings and (ii) a second name-based encoding for the second column based at least in part on the second plurality of column name character embeddings;
identifying (i) a first plurality of sampled column values for the first column and (ii) a second plurality of sampled column values for the second column;
determining, using a sequential column value processing sub-model of the column value encoding machine learning model, (i) a first plurality of column value encodings for the first plurality of sampled column values and (ii) a second plurality of column value encodings for the second plurality of sampled column values
determining (i) a first value-based encoding of the first column based at least in part on the first plurality of column value encodings and (ii) a second value-based encoding of the second column based at least in part on the second plurality of column value encodings;
determining a name-based cross-column similarity measure for the column pair based at least in part on the first name-based encoding and the second name-based encoding;
determining a value-based cross-column similarity measure for the column pair based at least in part on the first value-based encoding and the second value-based encoding; and
determining the cross-column similarity measure for the column pair based at least in part on the name-based cross-column similarity measure and the value-based cross-column similarity measure;
determining an anomaly measure for a first column value encoding of the first plurality of column value encodings with respect to a second column value encoding of the second plurality of column value encodings;
determining that the first plurality of sampled column values comprises one or more anomalous column values based at least in part on the anomaly measure;
automatically generating a mapping from the inbound table to the sample outbound table while simultaneously purging the inbound table of the one or more anomalous column values, wherein the mapping is generated by selecting the column pair from a plurality of column pairs based at least in part on the cross-column similarity measure such that a column of the inbound table is assigned to a selected column of the sample outbound table, wherein the selected column of the sample outbound table has a highest cross-column similarity measure with respect to the column of the inbound table; and
automatically ingesting the inbound data table into the data collection scheme system based on according to the generated mapping and without the one or more while simultaneously purging the inbound table of anomalous column values.

* * * * *

UNITED STATES PATENT AND TRADEMARK OFFICE
CERTIFICATE OF CORRECTION

PATENT NO. : 12,461,900 B2
APPLICATION NO. : 17/455592
DATED : November 4, 2025
INVENTOR(S) : Swapna Sourav Rout et al.

Page 1 of 1

It is certified that error appears in the above-identified patent and that said Letters Patent is hereby corrected as shown below:

In the Claims

In Column 26, Line 13, Claim 2, delete "initiating" and insert -- initiating a --, therefor.
In Column 27, Line 14, Claim 10, delete "system, the" and insert -- system, and the --, therefor.
In Column 28, Line 38, Claim 11, delete "inferred" and insert -- plurality of inferred --, therefor.
In Column 29, Line 36, Claim 18, delete "that comprises" and insert -- comprises --, therefor.
In Column 30, Line 52, Claim 18, delete "table into" and insert -- into --, therefor.
In Column 30, Line 53, Claim 18, delete "scheme system based on" and insert -- scheme --, therefor.
In Column 30, Lines 55-56, Claim 18, delete "while simultaneously purging the inbound table of anomalous" and insert -- anomalous --, therefor.

Signed and Sealed this
Third Day of February, 2026

John A. Squires
*Director of the United States Patent and Trademark Office*